March 23, 1965   E. H. WITTENBERG ETAL   3,174,658
FLUID PRESSURE LIQUID SPRAYER
Filed Dec. 4, 1961
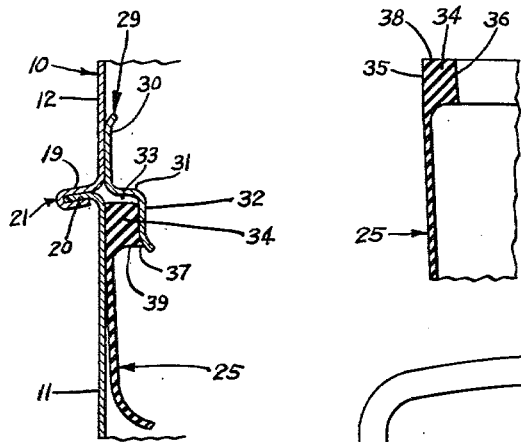
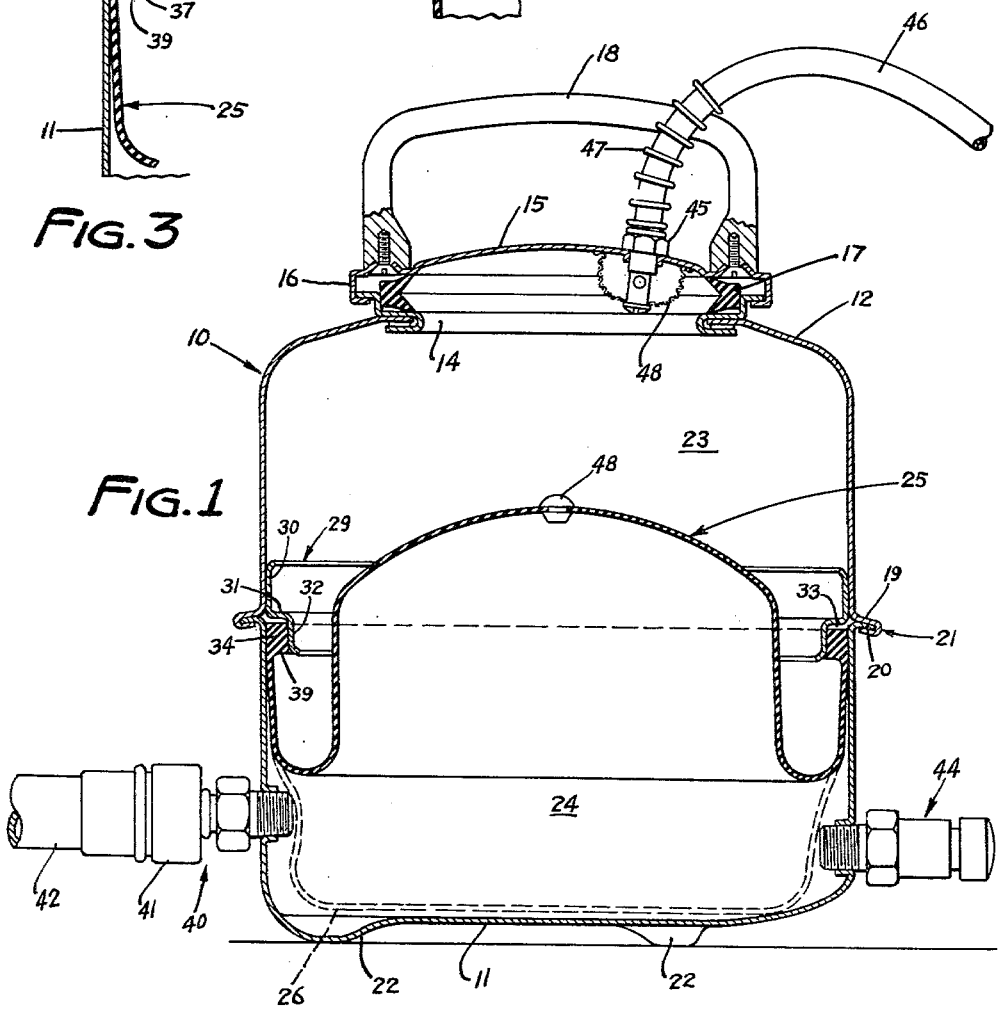
INVENTORS
EDWARD H. WITTENBERG
BY JEROME H. CHOPA
ATTORNEYS United States Patent Office 3,174,658
Patented Mar. 23, 1965

3,174,658
FLUID PRESSURE LIQUID SPRAYER
Edward H. Wittenberg and Jerome H. Chopa, both of P.O. Box 38, La Crosse, Wis.
Filed Dec. 4, 1961, Ser. No. 156,858
3 Claims. (Cl. 222—386.5)

This invention relates to new and useful improvements in liquid sprayers and more particularly to sprayers which are actuated by water pressure.

The present invention constitutes an improvement and modification of the invention described and claimed in copending application Serial No. 853,890, now Patent No. 3,018,970, wherein there is disclosed a simple, inexpensive liquid sprayer adapted for a wide range of uses, and adapted to be made in various sizes from the small garden variety of sprayer to the relatively large sprayers such as used by nurseries, truck gardeners, etc. The invention herein disclosed readily lends itself to use in that type of sprayer, or others like it, which comprise a tank having a flexible diaphragm therein dividing the interior of the tank into two non-communicating chambers, one providing a reservoir for a liquid to be sprayed and the other a pressure chamber for receiving a pressure fluid, such as water under pressure, such pressure fluid actuating the diaphragm to place the chemical or insecticide or other liquid in the reservoir under pressure whereby, when a spray gun or nozzle in communication with the reservoir is actuated by an operator, chemical is sprayed onto plants, etc.

As is usually the case in any line of endeavor, there is a constant striving to accomplish a particular objective as simply, inexpensively, yet effectively as possible. It is this striving for an inexpensive and facile means to secure and maintain the aforesaid flexible diaphragm within the tank to provide a tight seal between the tank chambers, that has given rise to the present invention.

It is therefore the principal object of this invention to provide a fluid operated liquid sprayer having annular sealing means which cooperate with the cylindrical tank to provide an effective diaphragm sealing means requiring only a few inexpensive and durable parts.

It is another object of this invention to provide an improved liquid sprayer which may be easily assembled thereby requiring a minimum of labor and expense to manufacture.

A further object of this invention resides in the provision of an improved fluid operated liquid sprayer which is quickly and easily put to operation, which displays superior utility in use, and which requires a minimum of effort to service.

It is still a further object of this invention to provide safety means for the fluid-operated liquid sprayer of the class described to prevent rupture of the flexible diaphragm when excesive pressures are encountered.

Other objects of the invention will become apparent as the description proceeds.

The invention illustrated by the drawings in which the same numerals refer to corresponding parts and in which:

FIGURE 1 is a vertical sectional elevation of the sprayer showing a flexible conduit or hose attached to the upper end of the tank and a pressure fluid conduit or garden hose at the lower portion of the tank below the diaphragm;

FIGURE 2 is an enlarged fragmentary vertical section showing the wedge shaped bead of the diaphragm; and FIGURE 3 is an enlarged fragmentary vertical section showing the structure of the diaphragm seal in greater detail.

The sprayer comprises a generally cylindrical tank, generally designated by the numeral 10, having a bottom portion 11 and a top portion 12, the latter shown provided with an opening 14 which is normally closed by a suitable cover 15. Suitable means indicated at 16 is provided for locking the cover to the tank wall 12 in a manner to compress the annular resilient sealing ring 17 to render the closure leaktight. A suitable carrying handle 18 is secured to the cover 15.

The bottom edge 19 of top portion 12 of the tank and the top edge 20 of bottom portion 11 of the tank are crimped together, as shown at 21 in FIGURE 1, to provide in effect an integral tank structure. The bottom wall of bottom tank portion 11 is preferably formed with a plurality of downward protrusions 22 which serve as feet for the tank to rest upon.

Means are provided within the tank for dividing it into two non-communicating chambers 23 and 24, chamber 23 serving as a reservoir for a suitable liquid to be sprayed, and chamber 24 serving as a pressure chamber, as will subsequently be described.

To divide the interior of the tank into two separate chambers a flexible diaphragm, generally designated by the number 25, is removably supported within the tank. The diaphragm, when in its normal relaxed state, is generally cup-shaped in configuration, as indicated by the dotted line 26 in FIGURE 1. The diaphragm is so proproportioned that when in its relaxed state its bottom wall may rest upon the bottom wall of the tank, and its cylindrical wall conforms generally to the cylindrical wall of the tank.

An important and distinguishing feature of the liquid sprayer disclosed resides in the positive sealing means provided for maintaining the upper marginal edge portion of the diaphragm in sealed relation to the tank wall, whereby the connection between the wall and the tank will be leaktight and there will be no leakage between chambers 23 and 24. To accomplish this, an annular retainer, generally designated 29, is provided intermediately of the ends of the tank and secured to the interior face thereof. The annular retainer, which is formed from a rigid material, comprises generally three portions formed by a series of contoured bends. The first portion 30 is generally vertical and provides a back section for securing the retainer to the interior surface of the tank, such as by welding. The second portion 31, as shown, is generally horizontal and projects inwardly away from the bottom edge of portion 30 and the interior wall of the tank and the third portion 32 is again generally vertical and extends downwardly from the inner edge of portion 31 to provide an annular recess 33 in the form of a groove or channel between its inward surface and the interior surface of the tank wall. Thus the annular recess 33 provides a diaphragm-receiving space for engagement therein of an enlarged wedge-shaped bead 34, hereinbelow defined, which is provided on the outer periphery of the flexible diaphragm 25.

The enlarged bead 34 is proportioned so that when engaged in the annular recess 33 it fits snugly therein and is retained thereby, much as a cork in a bottle. Bead 34 includes an outer face 35, being contiguous with the inner surface of the cylindrical wall of the diaphragm, which firmly presses upon the interior face of the tank. An inner face 36 opposes face 35 and firmly presses upon the outer surface of portion 32 of the retainer 29. For apparent reasons, the inner face 36 is tapered slightly so as to aid the engagement of the bead and when under compression distorts to produce a V-shaped flange portion at the base, as indicated at 37, which conforms to the contour of the outward surface of portion 32 to improve the seal. The top face 38 of the bead, which constitutes the outermost edge of the diaphragm, is preferably flat.

To secure the diaphragm in position within the tank, the annular bead 34 at the upper marginal edge thereof is press fitted into the recess 33 and the resiliency of the material from which the bead or diaphragm is constructed is sufficient to hold the bead expanded within the recess until pressure is subsequently introduced in the tank chambers. The diaphragm is preferably constructed of a natural or synthetic rubber or rubber-like material such as neoprene or the like as are well known in the industrial field.

The bottom face 39 of the bead is also substantially flat to provide a horizontally disposed area whereby the hydrostatic pressure of the liquid contained in upper chamber 23 exerts a vertical force thereon to aid in maintaining engagement of the bead in the retaining ring.

The lower portion of tank bottom section 11 is provided with a fitting 40 comprising an interiorly threaded cap 41 to which one end of a suitable conduit 42, such as a garden hose, may readily be attached. The opposite end of the hose 42 is connected to a suitable source of water or other fluid under pressure, not shown. Fitting 40 may be optionally provided with a check valve ball and spring to prevent back seepage into the conduit 42 or garden hose. A fitting 44 which is shown opposite fitting 40 in the lower portion of tank section 11 provides means for releasing pressure as desired in lower chamber 24 and also provides means for draining the water left therein after the spraying operation is completed.

A fitting 45 is secured to the cover 15 to provide an outlet for the liquid to be sprayed. One end of flexible tube 46 is affixed to the fitting 45 and resilient helical wire protector 47 of conventional structure has one end secured to the fitting 45 and extends upwardly therefrom over the adjacent end of tube 46 to prevent the tube from kinking and becoming damaged adjacent to the tank when the sprayer is in use. A conventional spray gun or nozzle, not shown, is generally attached to the free end of tube 46. A suitable screen 48 prevents foreign matter which may be introduced into the reservoir 23 from entering tube 46 and causing the nozzle of the spray gun to become clogged, as will be understood.

In the operation of the sprayer herein disclosed a suitable chemical or other liquid to be sprayed is introduced into the reservoir 23 when the cover 15 is removed from the top portion 12 of the tank. Before the chemical is delivered into the reservoir 23, the diaphragm may be in its normal relaxed state, as indicated by the dotted lines 26 shown in FIGURE 1. As the chemical is delivered into the cup-shaped diaphragm at the bottom of the tank 10, the wall of the diaphragm urged outwardly into engagement with the wall of the bottom tank section as a result of the weight of the chemical or other liquid to be sprayed. The cover 15 is then applied to the tank to close the filler opening 14 after which water under pressure is delivered into the bottom of the tank from the hose 42. As the water under pressure enters the tank below the diaphragm, the wall of the diaphragm is distorted and moved upwardly against the liquid to be sprayed in reservoir 23, whereby the insecticide or liquid to be sprayed is placed under pressure which equal to the pressure of the water introduced into the lower portion of the tank. Air entrapped within the reservoir may be released by manipulation of a trigger commonly provided on the spray gun. After the entrapped air has thus been released from the reservoir 23 the liquid contained therein may be freely sprayed from the spray gun by manipulation of its trigger as is well known.

Flexible tube 46 is preferably approximately 20 to 25 feet long whereby the sprayer tank 10 may be placed on the lawn and the operator need only carry the spray gun to get to the plants, as will be understood. The hose 42 may be of any suitable length depending upon where and how the sprayer is to be used. The sprayer may readily be carried about by grasping the handle 18 with one hand and actuating the spray gun with the other.

The atomization of the chemical to be sprayed may be conveniently controlled by varying the pressure of the water delivered into the pressure chamber 24 from the hose 42. If desired, a suitable pressure regulating valve, not shown in the drawings, may be provided in the water supply hose 42 for controlling the pressure of the chemical in the reservoir.

Diaphragm 25 is preferably apertured at its center to receive a tight fitting safety plug 48, which when in place is leaktight but is adapted to be released upwardly at a particular predetermined pressure as exerted by the liquid in lower chamber 24. By this means there is provided means for preventing the diaphragm from rupturing when the pressure in chamber 24 becomes excessively greater relative to upper chamber 23, such as when chamber 24 is pressurized and the cover 15 is left off the sprayer.

When a spraying operation has been completed, any liquid remaining in the reservoir 23 is removed therefrom through the filler opening 14 by removal of the cover 15. The diaphragm therein can readily be removed from the interior of the tank by simply disengaging the enlarged bead 34 from the annular recess 33 after which the diaphragm may be collapsed to permit its removal through the filler opening 14.

As will be readily appreciated there is thus provided an improved sprayer requiring inexpensive parts which can be easily assembled since the means of attaching the flexible diaphragm within the tank are greatly simplified; a reliable sprayer, for similar reasons, which thereby requires a minimum of maintenance; a versatile sprayer as depending upon the features herein disclosed; and a sprayer fulfilling the foregoing listed objectives.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A sprayer including a tank having upper and lower sections, a flexible removable diaphragm within said tank for dividing said tank into upper and lower non-communicating chambers, the upper chamber being adapted to contain a liquid to be sprayed and the lower chamber being adapted to receive a fluid under pressure, said diaphragm being generally cup-shaped and provided on its periphery with an annular inward projecting wedge-shaped bead of increased cross section; and annular sealing means comprising a first vertical annular portion secured to said interior surface of said tank, a second generally horizontal annular portion extending inwardly away from said interior surface of said tank and a third generally vertical annular portion depending therefrom to provide an annular bead-receiving channel between the third portion and the interior surface of the tank whereby when said annular bead is engaged in said bead-receiving channel, it is retained thereby and as pressure is applied to said chambers said bead cooperates with said channel and tank wall to firmly seal said lower chamber from said upper chamber, said bead of said diaphragm including top and bottom faces and inner and outer faces, said bottom face being substantially horizontally disposed and parallel with said top face and of ample area whereby the hydrostatic pressure of the liquid contained in said upper chamber acts on said bottom face to maintain said bead in engagement with said bead-receiving channel.

2. The sprayer according to claim 1 further characterized in that said outer face of said bead is tapered relative to said inner face.

3. The sprayer according to claim 1 further characterized in that said flexible diaphragm is provided with an aperture fitted with pressure releasable safety plug means to prevent said diaphragm from breaking when the pressure in said lower chamber becomes excessive relative to said upper chamber.

References Cited in the file of this patent
UNITED STATES PATENTS

| | | |
|---|---|---|
| 2,715,418 | Van Derbeck | Aug. 16, 1955 |
| 2,735,589 | Milster et al. | Feb. 21, 1956 |
| 2,889,078 | Thomas | June 2, 1959 |
| 3,038,501 | Greer | June 12, 1962 |